(12) United States Patent
Azad et al.

(10) Patent No.: US 11,437,639 B2
(45) Date of Patent: Sep. 6, 2022

(54) COMPOSITION FOR USE AS AN ELECTROLYTE IN A PROTONIC CERAMIC FUEL CELL AND A FUEL CELL THEREOF

(71) Applicant: Universiti Brunei Darussalam, Bandar Seri Begawan (BN)

(72) Inventors: Abul Kalam Azad, Bandar Seri Begawan (BN); Ahmed Afif bin Abedin, Bandar Seri Begawan (BN); Sumon Reza, Bandar Seri Begawan (BN); Shahzad Hossain, Bandar Seri Begawan (BN); Juliana Zaini, Bandar Seri Begawan (BN)

(73) Assignee: Universiti Brunei Darussalam, Jalan Tungku Link (BN)

( * ) Notice: Subject to any disclaimer, the term of this patent is extended or adjusted under 35 U.S.C. 154(b) by 51 days.

(21) Appl. No.: 17/008,146

(22) Filed: Aug. 31, 2020

(65) Prior Publication Data

US 2022/0069326 A1 Mar. 3, 2022

(51) Int. Cl.
*H01M 8/1016* (2016.01)
(52) U.S. Cl.
CPC .. *H01M 8/1016* (2013.01); *H01M 2300/0071* (2013.01); *H01M 2300/0077* (2013.01)

(58) Field of Classification Search
CPC ....... H01M 8/1016; H01M 2300/0071; H01M 2300/0077
See application file for complete search history.

(56) References Cited

PUBLICATIONS

IET Deigital Library; Structural studied of BaCe0.7Zr0.1Y0.1Pr0.1O3-d pervoskite for IT-SOFCS; S. Hossain, A.M. Abdalla; A.H. Bin-Karim; J.H. Zaini; M.S. Abu-Bakar; M.A. Islam; A.K. Azad; 7th Brunei International Conference on Engineering and Technology 2018 (Year: 2018).*
IOP Conference Series Material Science and Engineering; Structural and electrochemical characterization of BaCe0.7Zr0.2Y0.05Zn0.05O3; Ahmed Afif Bin Abedin, Quentin Cheok, et al.; Mar. 2016 (Year: 2016).*

* cited by examiner

*Primary Examiner* — Sarah A. Slifka
*Assistant Examiner* — Rachel L Zhang
(74) *Attorney, Agent, or Firm* — Sinorica LLC

(57) ABSTRACT

The present invention relates to a solid oxide fuel cell especially protonic ceramic fuel cell which can operate at intermediate temperature and fuel cell thereof. The composition comprising a formula $BaCe_{0.7}Zr_{0.25-x}Y_xZn_{0.05}O_{3-\delta}$ or $BaCe_{0.7}Zr_{0.1}Y_{0.2-x}Pr_xO_{3-\delta}$, wherein x=0.05, 0.1, 0.15, 0.2 or 0.25 to vary Zr and Y percentage at the B-site, and Ba=100%, Ce=70%; and Zn=5%.

4 Claims, 3 Drawing Sheets

US 11,437,639 B2

COMPOSITION FOR USE AS AN ELECTROLYTE IN A PROTONIC CERAMIC FUEL CELL AND A FUEL CELL THEREOF

FIELD OF THE INVENTION

The present invention relates to a solid oxide fuel cell especially protonic ceramic fuel cell which can operate at intermediate temperature.

BACKGROUND OF THE INVENTION

Standard conventional technologies based on fossil fuels are not able to satisfy the growing demand for energy therefore, the future lies in the implementation of efficient and environmentally friendly technologies to produce electricity like hydrogen energy and fuel cell. During the past decades, fuel cells especially solid oxide fuel cells ("SOFCs") have attracted significant attention to their high efficiency, low emissions, and excellent eco-friendly in high working temperature (700-1000° C.) electrochemical energy conversion device. Presently, Yttria-stabilized zirconia ("YSZ") is the state-of-art electrolyte as it possesses an adequate oxide-ion conductivity (~0.13 $Scm^{-1}$ at 1000° C.) and shows desirable phase stability in both oxidizing and reducing atmospheres.

However, this high operating temperature leads to high system costs, cell degradation, materials compatibility, and dissatisfactory durability. To reduce and overcome these problems, protonic ceramic fuel cells ("PCFCs") have been introduced over SOFCs in intermediate temperature ("IT") range (400-700° C.) due to higher mobility of proton ion than oxygen ion. Due to the requirement of low activation energy for protonic defect transport compared to the oxygen vacancy transport, PCFCs have several advantages, e.g. critical materials required for cell components and reduced system cost which is important for large scale commercialization.

Barium cerates, e.g. $BaCe_{0.9}Y_{0.1}O_{3-\delta}$, generally exhibit the highest proton conductivities; however, these materials are unstable at high temperatures in the presence of CO2 and steam. In CO2 or humid atmospheres, barium cerates easily react and decompose into barium carbonate (or barium hydroxide) and cerium oxide.

On the other hand, alkaline earth zirconates such as calcium, strontium, or barium zirconates show, in general, better chemical and mechanical stability than the analogous cerates, but lower protonic conductivity. When trivalent cations are doped on the B-site, some of the zirconates show pure protonic conductivity in a hydrogen atmosphere at high temperatures (600-1000° C.).

However, very significant differences, which seem to be related to synthesis conditions, exist in reported conductivities of zirconates. The n-type conductivity was found to be relatively high under reducing conditions in barium cerate and other cerates, while almost negligible in the zirconates. Therefore, a solid proton conductor that combines the high chemical stability of the zirconates and the high conductivity of the cerates is very interesting to study. Perovskites with Ba at the A-site and trivalent cation substitution for cerium and zirconium at the B-site are now an important issue, subject to extensive investigation due to their high durability and good protonic conductivity.

As better candidate materials, BaCeO3-BaZrO3 perovskite has been studied for its high conductivities. Due to the highly resistive nature of its grain boundaries, BaZrO3 has lower conductivity but higher chemical and thermal stability under both H2O and CO2 than BaCeO3.

However, the combination of BaCeO3-BaZrO3 doping with yttrium along with different Ce and Zr content exhibited high conductivity with good chemical stability and high cell performance. Nonetheless, these electrolytes can only be obtained above 1500° C., where such high sintering temperature leads to Ba evaporation and loss of conductivity and cell performance.

Therefore, there exists a need for a composition for use as an electrolyte in a protonic ceramic fuel which addresses at least the abovementioned problems.

SUMMARY OF THE INVENTION

Accordingly, in one aspect the invention provides a composition for use as an electrolyte in a protonic ceramic fuel cell comprising a formula $BaCe_{0.7}Zr_{0.25-x}Y_xZn_{0.05}O_{3-\delta}$ wherein x=0.1, 0.15, 0.2 or 0.25 and δ=0.1, 0.125, 0.15 or 0.175, respectively, to vary Zr and Y percentage at the B-site, and Ba=100% at the A-site.

In some embodiments, for $BaCe_{0.7}Zr_{0.25-x}Y_xZn_{0.05}O_{3-\delta}$ the value of x is selected from x=0.05, 0.15, or 0.2 and δ=0.1 to vary Y and Pr percentage at the B-site, and Ba=100% at the A-site.

In some embodiments, bulk and total conductivity of the composition reaches $9.23 \times 10^{-3}$ and $1.55 \times 10^{-02} Scm^{-1}$ for $BaCe_{0.7}Zr_{0.25-x}Y_xZn_{0.05}O_{3-\delta}$ at 600° C. in wet condition.

In some embodiments, activation energies of the composition for bulk and total conductivity in wet conditions below 650° C. are 0.58 and 0.60 eV respectively.

In some embodiments, a fuel cell comprising a body frame, a gas line, an interconnect, cell stacks, gas sealings, and ceramic screws wherein the electrolyte made of the composition as claimed in claim 1.

BRIEF DESCRIPTION OF THE DRAWINGS

Reference will be made to embodiments of the invention, examples of which may be illustrated in accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

The present invention is directed towards a solid oxide fuel cell especially protonic ceramic fuel cell which can operate at intermediate temperature.

Figure 1:
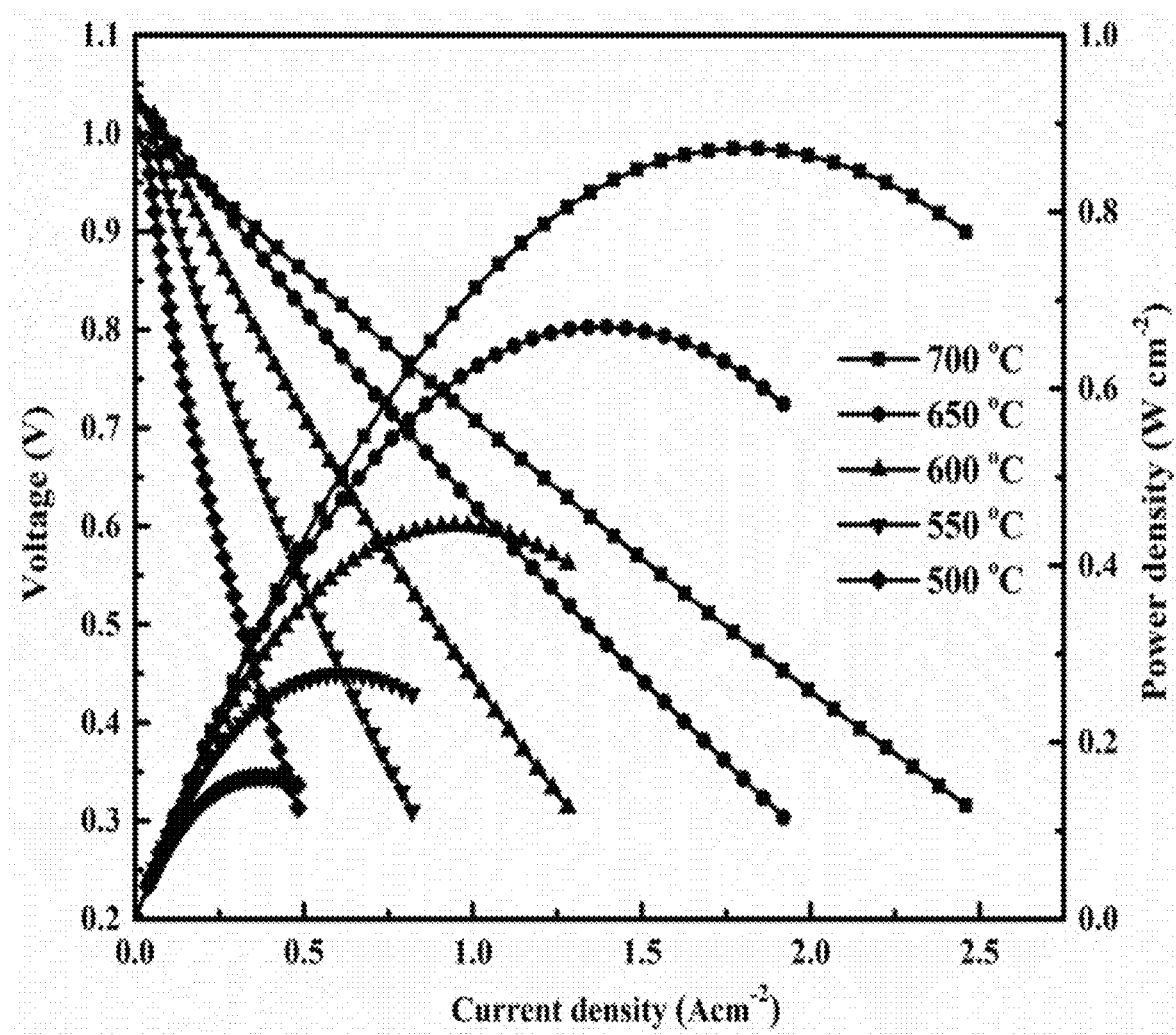
FIG. 1 is a graph showing I-V and power-density of a fuel cell using the claimed composition in accordance with an embodiment of the present invention.

FIG. 1 shows the current-voltage and power-density curves of the fuel cell using humidified $H_2$ (3% $H_2O$) as the fuel and ambient air as the oxidant for the cathode at 500~700° C. in accordance with an embodiment of the present invention.

In an embodiment, the present invention discloses a composition for use as an electrolyte in a protonic ceramic fuel cell. The composition comprising a formula $BaCe_{0.7}Zr_{0.25-x}Y_xZn_{0.05}O_{3-\delta}$ or $BaCe_{0.7}Zr_{0.1}Y_{0.2-x}Pr_xO_{3-\delta}$ In an exemplary embodiment, the value of x can be selected from 0.1, 0.15, 0.2 or 0.25 for $BaCe_{0.7}Zr_{0.25-x}Y_xZn_{0.05}O_{3-\delta}$ to vary Zr and Y percentage at the B-site. The value of $\delta$ is 0.1, 0.125, 0.15 or 0.175 for x=0.1, 0.15, 0.2 or 0.25, respectively. Further, in an exemplary embodiment, the percentage value of Ba at the A-site is 100% and Ce, and Zn at the B-site is 70% and 5%. Advantageously, the composition shows high power density at an intermediate temperature range during the operation of a fuel cell. For $BaCe_{0.7}Zr_{0.1}Y_{0.2-x}Pr_xO_{3-\delta}$ the value of x can be selected from 0.05, 0.15, or 0.2 to vary Y and Pr percentage at the B-site where Ba, Ce, and Zr are 100%, 70%, and 10%, respectively. The value of $\delta$ is 0.1 on the composition to calculate the total oxygen occupancy.

The method of making the abovementioned composition will now be explained. In an exemplary embodiment, the composition of $BaCe_{0.7}Zr_{0.1}Y_{0.15}Zn_{0.05}O_{3-\delta}$ is prepared by using solid-state reaction method from $BaCO_3$ (99% purity, Merck, Germany), $CeO_2$ (99% purity, Aldrich, China), $ZrO_2$ (99% purity, Sigma-Aldrich, UK), $Y_2O_3$ (99.9% purity, Aldrich, China) and ZnO (99% purity, Merck, Germany). Firstly, stoichiometric amounts of aforesaid selected materials are ball-milled in ethanol using zirconia balls for more than 24 h using. Thereafter, the ball-milled materials are dried in the oven and then calcined at about 650° C. for about 10 hours, cooled down to room temperature ("RT"), and subsequently grounded and palletized using 15 mm diameter die under pressure 20 MPa for about 1 min. The palletized $BaCe_{0.7}Zr_{0.1}Y_{0.15}Zn_{0.05}O_{3-\delta}$ sample is then sintered at 1000° C. for about 10 hours and cooled down to RT. The pellet is again grounded, re-palletized and sintered again at 1200° C. for about 10 hours.

The final sintering of $BaCe_{0.7}Zr_{0.1}Y_{0.15}Zn_{0.05}O_{3-\delta}$ is at 1400° C. for about 10 hours for cell performance and other characterization.

In an embodiment, Solid-state reaction (SSR) method is used for the preparation of three different compositions of $BaCe_{0.7}Zr_{0.1}Y_{0.2-x}Pr_xO_{3-\delta}$ (x=0.05, 0.1 and 0.2) (BCZYP). Firstly, a stoichiometric amount of $BaCO_3$ (99% purity, Merck, Germany), $CeO_2$ (99% purity, Aldrich, China), $ZrO_2$ (99% purity, Sigma-Aldrich, UK), $Y_2O_3$ (99.9% purity, Aldrich, China) and $Pr_6O_{11}$ (99% purity, Sigma-Aldrich, UK) are mixed by ball milling with ethyl alcohol and zirconia balls for 24 h. thereafter, the finely ground dried powders are calcined at 650° C. for 12 hours in zirconium crucible with a heating rate of 5° C. min$^{-1}$. The hydraulic press is utilized to make 32 mm diameter pellets under the pressure of 269 MPa for 1 min.

The palletized $BaCe_{0.7}Zr_{0.1}Y_{0.2-x}Pr_xO_{3-\delta}$ sample is then sintered at 900° C. for about 12 hours and cooled down to RT. The pellet is again grounded, re-palletized and sintered again at 1200° C. for about 12 hours.

The final sintering of $BaCe_{0.7}Zr_{0.1}Y_{0.2-x}Pr_xO_{3-\delta}$ is at 1550° C. for about 12 hours for cell performance and other characterization. All heat treatments are carried out in the air with heating and cooling rate of about 5°/min.

In an exemplary embodiment, materials are characterized by using X-ray powder diffraction (XRPD), neutron powder diffraction (NPD), thermogravimetric analysis (TGA), scanning electron microscopy (SEM), particle size analysis, impedance spectroscopy, and single-cell measurements.

Tests conducted by the inventors revealed that Rietveld analysis of XRD and Neutron data reveal a pure orthorhombic structure with PBNM space group for all compounds and the relative densities were more than 95%.

Further, in $BaCe_{0.7}Zr_{0.1}Y_{0.15}Zn_{0.05}O_{3-\delta}$, Y doped by Zr with adding Zn exhibit positive performance in terms of conductivity enhancement. For instance, Bulk and total conductivity of the claimed composition reaches $9.23 \times 10^{-3}$ and $1.55 \times 10^{-02}$ Scm$^{-1}$ at 600° C. in wet condition. Furthermore, activation energies for bulk and total conductivity in wet conditions below 650° C. are 0.58 and 0.60 eV, respectively. The total conductivity of the $BaCe_{0.7}Zr_{0.1}Y_{0.2-x}Pr_xO_{3-\delta}$ significantly change for Pr concentration and measuring temperature. At low temperatures, higher % of Pr show higher conductivity, but at a high temperature lower % of Pr show higher conductivity. The total conductivity values were $8.94 \times 10^{-3}$ Scm$^{-1}$, $9.07 \times 10^{-3}$ Scm$^{-1}$ and $1.14 \times 10^2$ Scm$^{-1}$ measured at 600° C. for x=0.05, 0.15 and 0.20 respectively under wet $H_2$ condition. The measured activation energies were 0.57 eV, 0.49 eV and 0.32 eV under wet $H_2$ condition for x=0.05, 0.15 and 0.20 respectively.

In another exemplary embodiment, the inventors have prepared a single NiO—$BaCe_{0.7}Zr_{0.1}Y_{0.15}Zn_{0.05}O_{3-\delta}$ (BCZYZn15|BCZYZn15|$Ba_{0.5}Sr_{0.5}Co_{0.8}Fe_{0.2}O_3$ BCZYZn15 cell and advantageously observed that peak power densities of 161, 278, 445, 670 and 872 mWcm$^2$ at 500, 550, 600, 650 and 700° C., respectively, which is the highest performance until now. Further, the open-circuit voltage (OCV) values of the cell were 0.998, 1.034, 1.037, 1.027, and 1.0 V at 500, 550, 600, 650, and 700° C., respectively, which is also advantageous.

Figure 2:
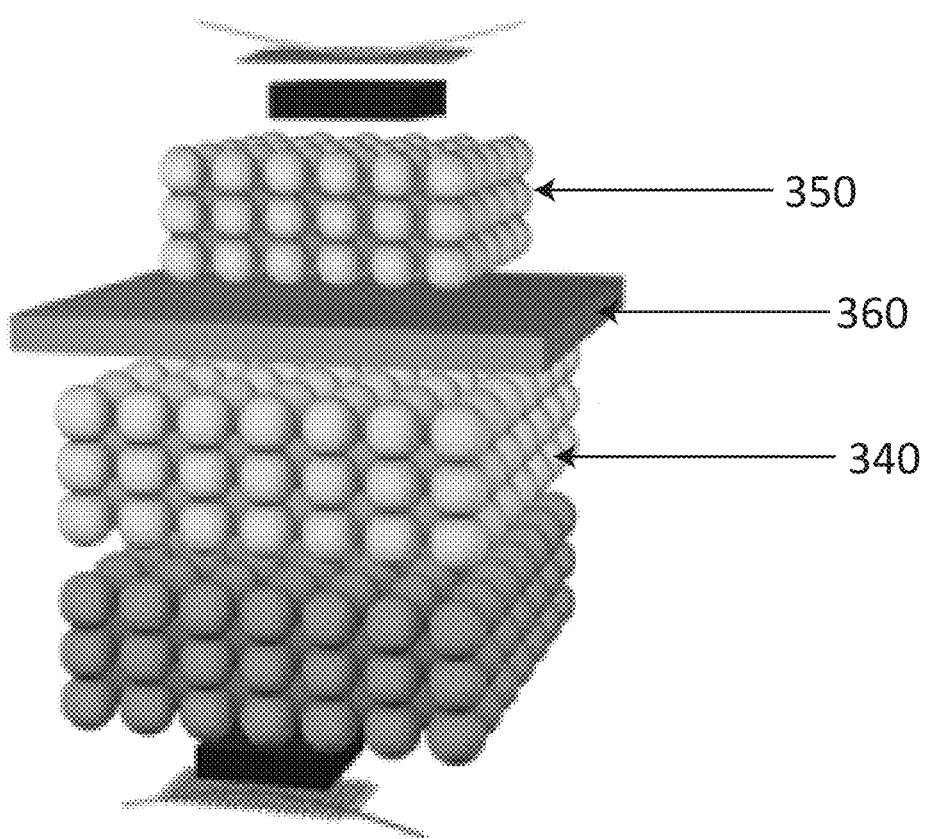
FIG. 2 shows a schematic 3D diagram of the fuel cell arrangement for a performance test in accordance with an embodiment of the present invention.

FIG. 2 shows a schematic 3D diagram of the fuel cell arrangement for a performance test in accordance with an embodiment of the present invention.

Figure 3:
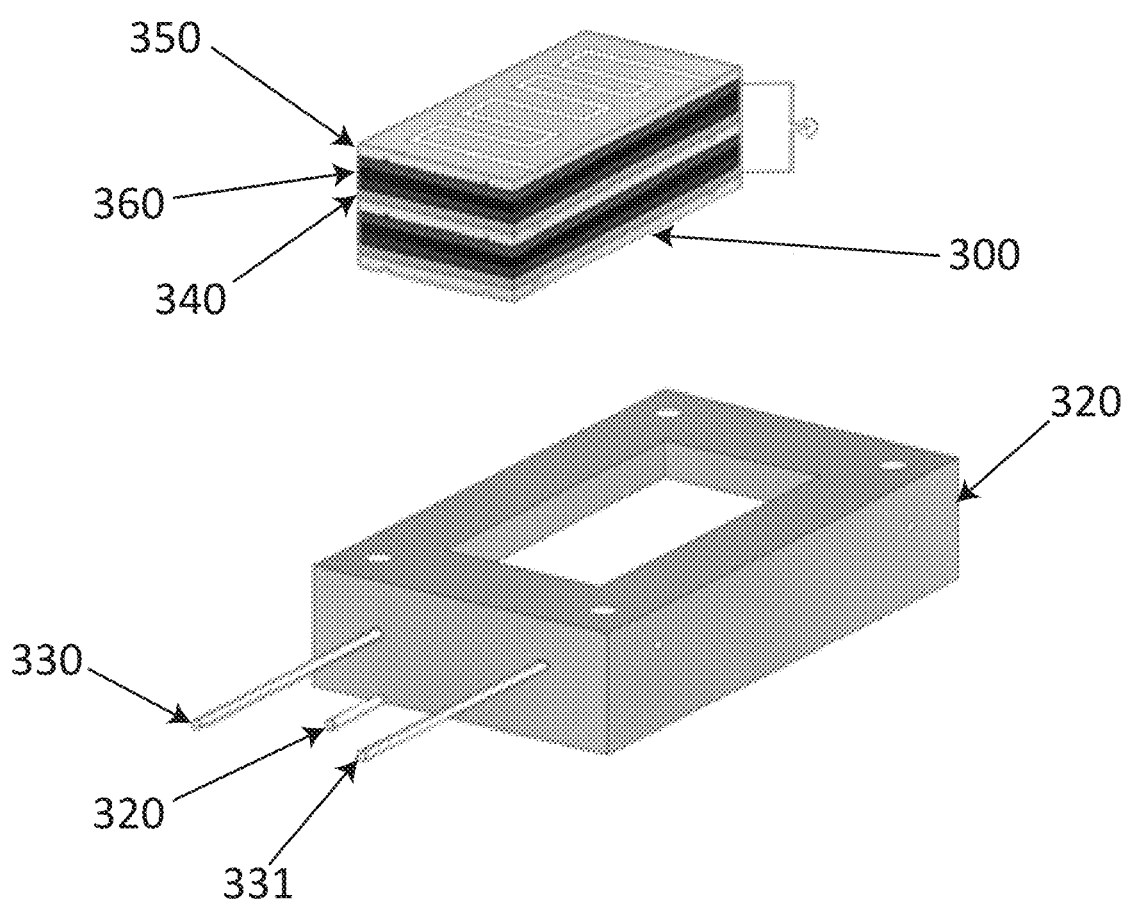
FIG. 3 shows an exploded view of the fuel cell in accordance with an embodiment of the present invention.

FIG. 3 shows an exploded view of the fuel cell in accordance with an embodiment of the present invention. In an embodiment, anode supported planar individual cells are prepared using the composition as described hereinabove. As shown in the cell stack 300, the interconnect 310 is a connective layer that physically and electrically connects the anode of one fuel cell to the cathode of the adjacent fuel cell in the SOFC stack. In operation, the cells are arranged in a stack and put in the manifold 320. The gas (water Out channel) 320 and airflow channels (air $O_2$ Out 330 and air $O_2$ In 331) provide equal and sufficient gas distribution. Interconnects are used to make the stack in series to get the expected output. In operation, at anode 340 oxidation reaction happens (electrons are released). At Cathode 350 reduction reaction occurs (electrons are acquired). In the fuel cell, hydrogen is oxidized at the anode 340, and oxygen reduction occurs at the cathode. An electrolyte 360 is provided which conducts ions from one electrode to the other.

While the present invention has been described with respect to certain embodiments, it will be apparent to those skilled in the art that various changes and modifications may be made without departing from the scope of the invention as defined in the following claims

What is claimed is:

1. A composition for an electrolyte, the composition comprising:
   $BaCe_{0.7}Zr_{0.25-x}Y_xZn_{0.05}O_{3-\delta}$;
   wherein x=0.15, 0.2 or 0.25, $\delta$=0.1, 0.125, 0.15 or 0.175, respectively, to vary Zr and Y percentage at B-site;
   Ba=100% at A-site;
   Ce=70%; and
   Zn=5% at the B-site.

2. The composition for the electrolyte as in claim 1, wherein bulk and total conductivity of the composition reaches $9.23 \times 10^{-3}$ and $1.55 \times 10^{-02}$ Scm$^{-1}$ for BCZYZn05 at 600° C. in wet condition.

3. The composition for the electrolyte as in claim 1, wherein activation energies of the composition for bulk and total conductivity in wet conditions below 650° C. are 0.58 and 0.60 eV respectively.

4. A composition for an electrolyte in a protonic ceramic fuel cell, the composition comprising:

$BaCe_{0.7}Zr_{0.1}Y_{0.2-x}Pr_xO_{3-\delta}$;

wherein x=0.15 or 0.2 and δ=0.1 to vary Y and Pr percentage at B-site;

Ba=100% at A-site;

Ce=70%; and

Zr=10% at the B-site.

* * * * *